United States Patent [19]
Wagner

[11] Patent Number: 5,431,113
[45] Date of Patent: Jul. 11, 1995

[54] EQUIPMENT AND PROCESS FOR MOLTEN ALLOY TREATMENT OF HAZARDOUS LIQUIDS AND SLURRIES

[76] Inventor: Anthony S. Wagner, 13709 Hwy. 71 W., Bee Caves, Tex. 78738-3117

[21] Appl. No.: 324,693

[22] Filed: Oct. 18, 1994

Related U.S. Application Data

[63] Continuation-in-part of Ser. No. 103,122, Aug. 9, 1993, Pat. No. 5,359,947, which is a continuation-in-part of Ser. No. 982,450, Nov. 29, 1992, Pat. No. 5,271,341, which is a continuation-in-part of Ser. No. 669,756, Mar. 15, 1991, Pat. No. 5,167,919, which is a continuation-in-part of Ser. No. 524,278, Jun. 16, 1990, Pat. No. 5,000,101.

[51] Int. Cl.⁶ .............................................. F23G 7/00
[52] U.S. Cl. ..................................... 110/237; 588/201; 110/346
[58] Field of Search ............... 110/237, 238, 255, 259, 110/101 CC, 101 CD, 204, 250, 346; 588/201

[56] References Cited

U.S. PATENT DOCUMENTS 5,301,620 4/1994 Nagel et al. ......................... 110/346

Primary Examiner—Denise L. Gromada
Assistant Examiner—Susanne C. Tinker
Attorney, Agent, or Firm—Joseph F. Long

[57] ABSTRACT

Equipment and process for using molten alloy in a low oxygen atmosphere for destruction of hazardous compounds and partial or complete extraction of heavy metals in slurries and solids with continuous discharge of undissolved solids and aqueous scrubbing of off-gas from the unit.

14 Claims, 7 Drawing Sheets

EQUIPMENT AND PROCESS FOR MOLTEN ALLOY TREATMENT OF HAZARDOUS LIQUIDS AND SLURRIES

BACKGROUND OF THE INVENTION

This a C.I.P. of Ser. No. 08/103,122, filed Aug. 9, 1993, now U.S. Pat. No. 5,359,947 entitled "Equipment and Process for Waste Pyrolysis and Off Gas Oxidative Treatment" which is a C.I.P. of Ser. No. 07/982450, filed Nov. 29, 1992, now U.S. Pat. No. 5,271,341 and entitled "Equipment and Process for Medical Waste Disintegration and Reclamation" which is, in turn, a C.I.P. of Ser. No. 07/669,756, U.S. Pat. No. 5,167,919, filed Mar. 15, 1991, entitled "Waste Treatment and Metal Reactant alloy Composition" which is, in turn, a C.I.P. of Ser. No. 07/524,278, U.S. Pat No. 5,000,101 filed Jun. 16, 1990, entitled "A Hazardous Waste Reclamation Process". The closest prior art is Ser. Nos. 08/103,122; 07/982,450; 07/699,756 and 07/524,278, all by Anthony S. Wagner, filed and entitled as outlined above.

The present invention differs significantly in having a unique under-the-surface diffuser designed to maximize contact and use the high specific gravity of the molten alloy and a baffle to eject solids from the alloy surface.

The invention comprises one or more ceramic diffusers designed to be mechanically submerged in the molten alloy with a liquid feed line going through the diffuser and exiting into a smooth or corrugated bottom face. The face is sloped upward to achieve maximum contact with the molten alloy to achieve total degradation of the hazardous liquid to carbon, hydrogen, nitrogen, and contact with solids to remove various metal ions, where present. The metallic ions will react to remain in the molten alloy. Anions such as bromine, chlorine, etc. will form salts with components of the alloy composition. The alloy is composed of aluminum, iron, copper, calcium, and zinc with amounts of each component as follows:

- 25–100 weight percent aluminum
- 0–50 weight percent iron
- 0–50 weight percent calcium
- 0–50 weight percent zinc
- 0–50 weight percent copper The aluminum may be the cheapest commercial grade containing a great number of metallic impurities or may be aluminum such as found at junk yards.

SUMMARY OF THE INVENTION

The invention comprises process and equipment for pyrolyzing a waste stream by pumping the hazardous liquid waste through a floating or partially submerged ceramic diffuser into a molten alloy composition. The alloy composition may be varied to suit a particular liquid waste stream. The alloy composition, normally aluminum, copper, calcium, iron and zinc, is held in a molten state at 650°–850° C. Induction heating is a preferred embodiment of a heater for the alloy pyrolysis reactor but fossil fuel heating is satisfactory. Pyrolysis is carried out in the near absence of atmospheric oxygen. Inert gas or carbon dioxide may be used for purging the system of atmospheric oxygen. Ceramic diffusers with a liquid feed line going through the ceramic diffusers may float or be held with diffuser faces submerged in the molten alloy. In a preferred embodiment the face of each diffuser is sloped upward to direct flotation of solids to the alloy surface and to assure maximum contact of the feed and initial degradation products with the molten alloy.

Off gas containing mainly hydrogen, water vapor, carbon, nitrogen and/or carbon dioxide may be subject to additional heat to achieve a temperature of over 450° C. by using an induction heater in the off gas line.

In a preferred embodiment, off gas is scrubbed using an aqueous liquid feed through spray nozzles in a scrubber-separator tank to remove carbon. Sludge from the cyclone separator is filtered through one of a pair of dual filters to remove carbon and allow in-line filter cleaning. Aqueous discharge from the filters may go through a cooler prior to recycling to spray nozzles for continuous scrubbing. Water make up or purge necessary will depend upon operating conditions. With temperatures of circulating liquid sufficiently high very little purge other than vapor to the atmosphere will be required. Normal controls and relief valves are used in the process.

DETAILED DESCRIPTION OF THE DRAWINGS

The invention may best be described from the drawings.

Figure 1:
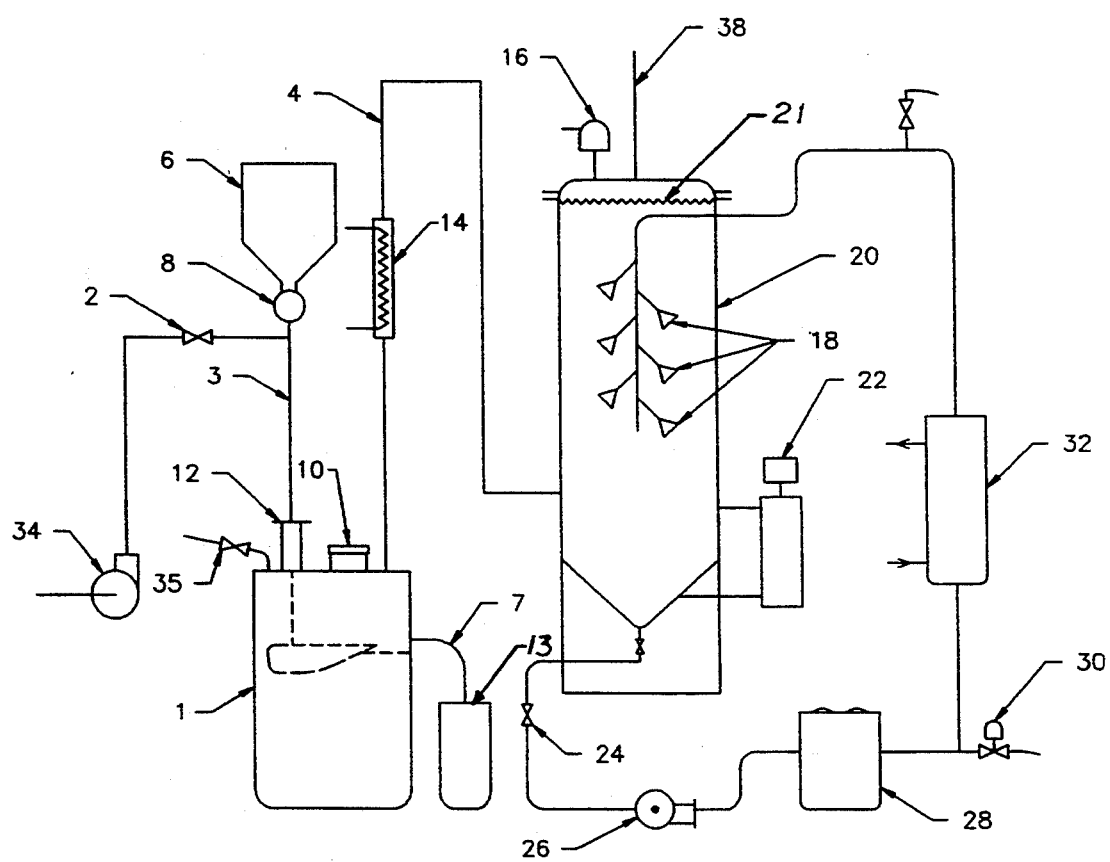
FIG. 1 schematically shows the process.

In FIG. 1 we've shown the process. The main unit of the process is the reactor 1 and embodiments will be described in detail under FIG. 2, 3, 4, 5, and 6. In the reactor 1 a molten alloy is heated and held molten either by induction heating or by fossil fuel heating. Molten alloy temperature may be varied widely and be sufficient for decomposition and reaction necessary for metal extraction, organic degradation to elements, melting glass etc. but a temperature of about 850° C. is preferred. At this temperature carbon dioxide would not be held by the calcium normally present in the molten alloy but chlorides would be held thus preventing loss through volatile aluminum chlorides. In operation slurry type wastes may be pumped by pump 34 through valve 2. Wastes may be fed from bin 6 using a motor driven star feeder type valve 8 or may be fed through feed bin 41 using a screw conveyor as shown in FIG. 7. Many slurry type wastes will completely disintegrate when forced under the molten alloy level in reactor 1 and carbon, hydrogen, nitrogen, carbon dioxide, water vapor will exit the reactor in the off gas. In some sludge type wastes such as refinery tailings all the lighter hydrocarbons will decompose, most of the heavy metals will be extracted, and all the water will be expelled. However some land-fillable solids will remain. These exit the reactor through line 7 to catch tank, 13.

Feed line 3 may be bolted directly to the top of the reactor 1 or go through packing gland 12 to allow adjustment in diffuser height. Before start up of the reactor 1 inert gas or carbon dioxide through valve 35 is used to purge air out of the system, including the reactor (1) and feed line (3). Reaction in an oxygen free environment is desirable. The reactor is equipped with a filling nozzle 10 for addition of metal to the alloy as needed. The filling nozzle may be hingedly closed with a high temperature glass to allow visual observation of the unit in operation.

Off-gas from the unit may go through an induction heater 14 designed to make certain that the off-gas temperature exceeds 450° C. to eliminate any traces of pathogens. Off-gas line 4 leads to scrubber 20. Scrubber 20 is equipped with a relief valve 16 which may be a simple flapper type valve balanced to open at less than 0.1 pound per square inch. Water fed through spray nozzles 18 in scrubber 20 serve both to cool and to scrub off gas in the unit. Scrubber 20 may be equipped with a demister 21. Loose woven wire demisters work well. Other type scrubber-separators could be used equally well. Water, carbon, and dissolved salts, if any, discharge through valve 24. Valve 24 would normally be open with automatic valve 30 being operatived automatically by level controller 22 to hold a low aqueous level in scrubber 20. The scrubbed off-gas exits to the atmosphere through line 38.

Aqueous effluent from the separator 20 goes through pump 26 which may be a centrifugal or diaphragm pump and through dual filters 28. Dual filters allow manual cleaning of one filter while the other continuous is operation.

The clean aqueous filtrate from filter 28 recycles through a cooler 32, which may be an air or water cooler to spray nozzles 18 to cool and scrub the incoming off-gas.

Figure 2:
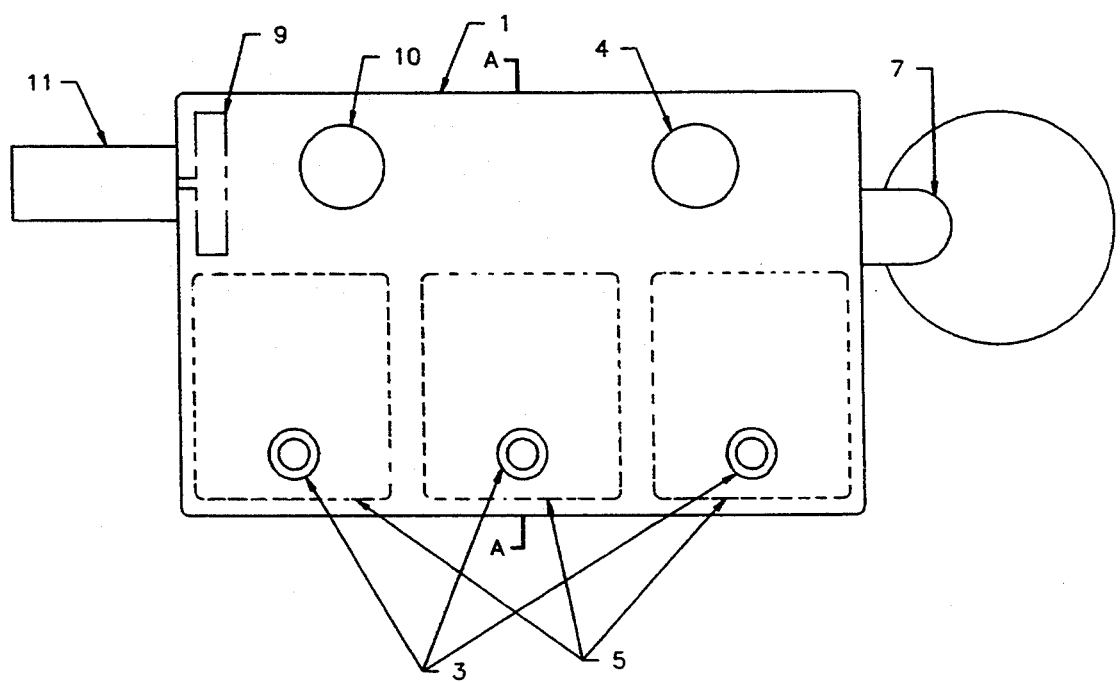
FIG. 2 shows a top view of the reactor in a first embodiment.

In FIG. 2 we've shown a top view of one preferred embodiment of reactor 1. Visible from the top are feed lines 3, that we've shown as three in number but could be a minimum of one depending upon unit size, off-gas line 4, sight glass and metal fill nozzle 10, power ram drive 11 and solids discharge line 7. Shown dotted is a top view of ram 9 and feed diffuser shoes 5. Feed diffuser shoes 5 are shown in more detail in FIG. 4. Ram drive 11 may be hydraulic or motor driven.

Figure 3:
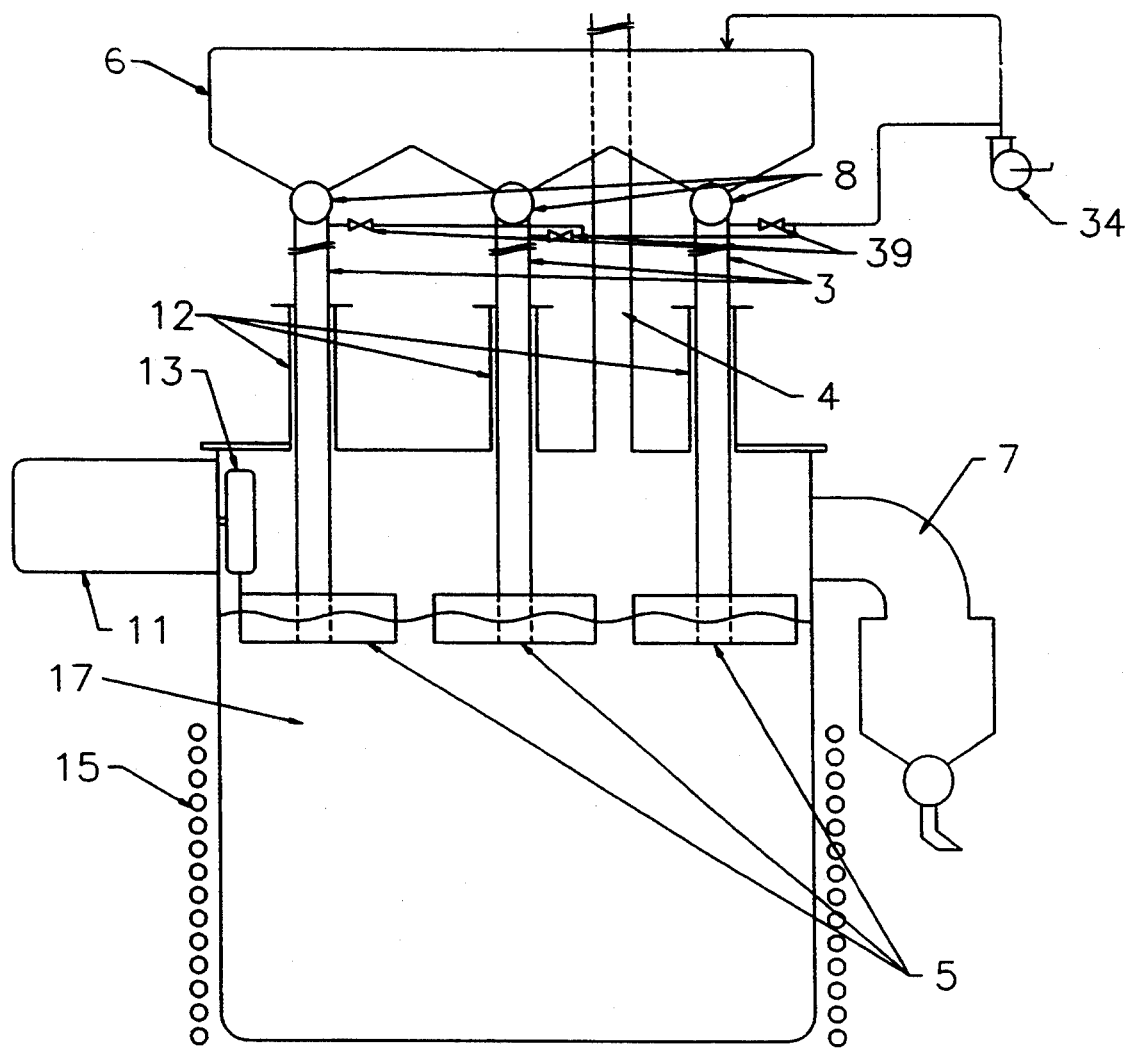
FIG. 3 shows a side view of the reactor of FIG. 2.

In FIG. 3 we show a side of a preferred embodiment of the reactor. We've shown induction coils 15 to hold alloy 17 at above 650° C. and preferably at about 850° C. A minimum level relative to diffuser shoes 5 for molten alloy 17 is shown in a wavy line. Slurries or near slurries or flowable solids may be fed from feed bin 6 through star feeder type valves 8 through feed tubes 3, alternatively pumpable sludges or slurries may be fed using a diaphragm pump 34 through valves 39 into feed tubes 3 and down through diffuser shoes 5 into molten alloy 17. Feed tubes 3 may either go through packing glands 12 or be bolted to top flanges, as shown in FIG. 4.

Ram 13 with drive gear 11 serves to push solids that accumulate on the surface of alloy 17 into a discharge line 7.

Figure 4:
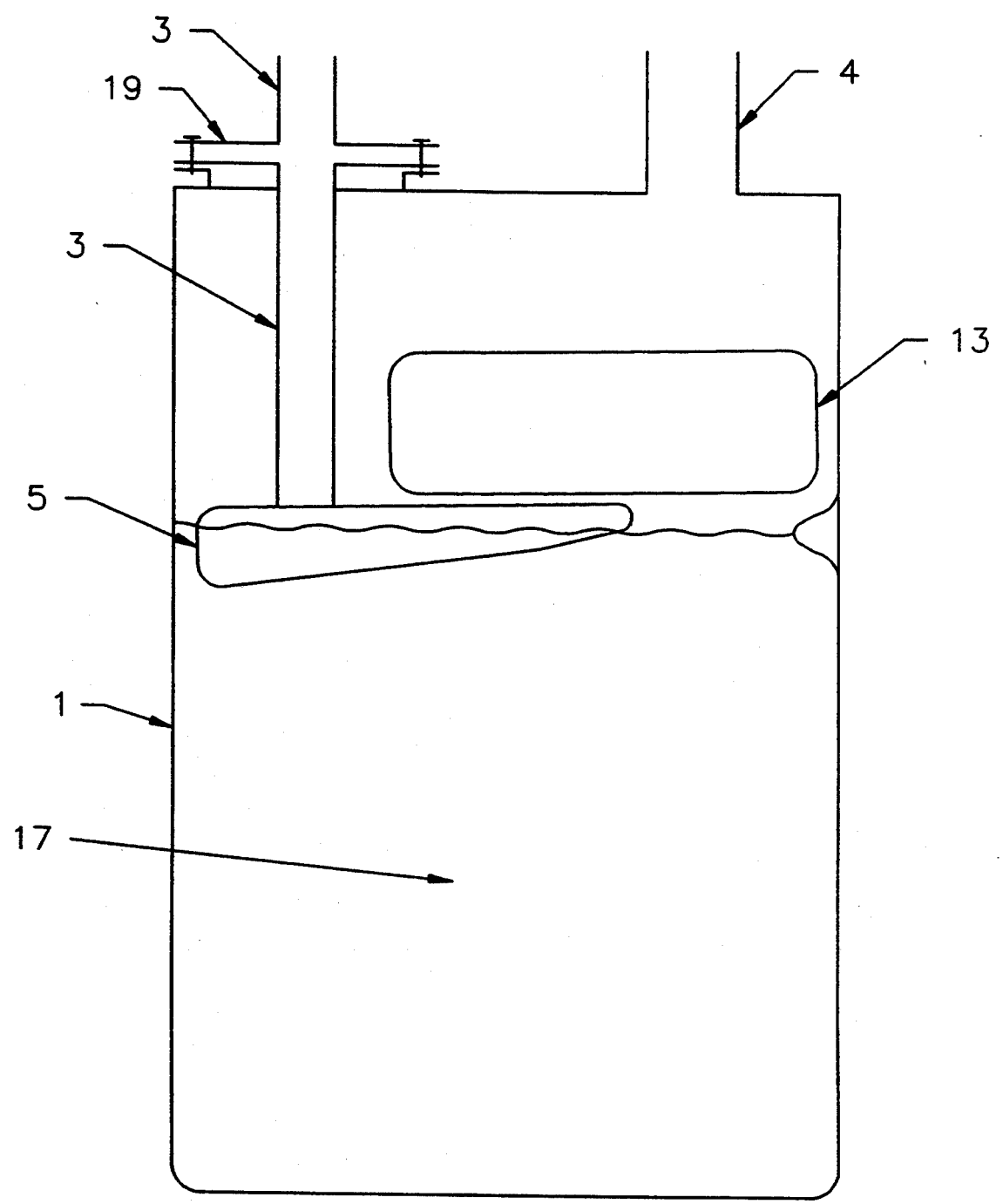
FIG. 4 shows an end view of reactor of FIG. 2 indicating relative location of major elements.

In FIG. 4 we've shown an end view of reactor 1 indicating shape of diffuser 5 and shape and relative location of ram 13. With bottom face of diffuser 5 sloping as indicated any solids will float upward below the molten alloy 17 surface to be in the path of ram 13 for discharge. Experience has shown that molten alloy 17 will penetrate many solids and effectively remove metals even when the solid is not totally disintegrated. In this view we've shown feed tube 3 bolted to the top at flange 19, stud bolts would be preferred.

Figure 5:
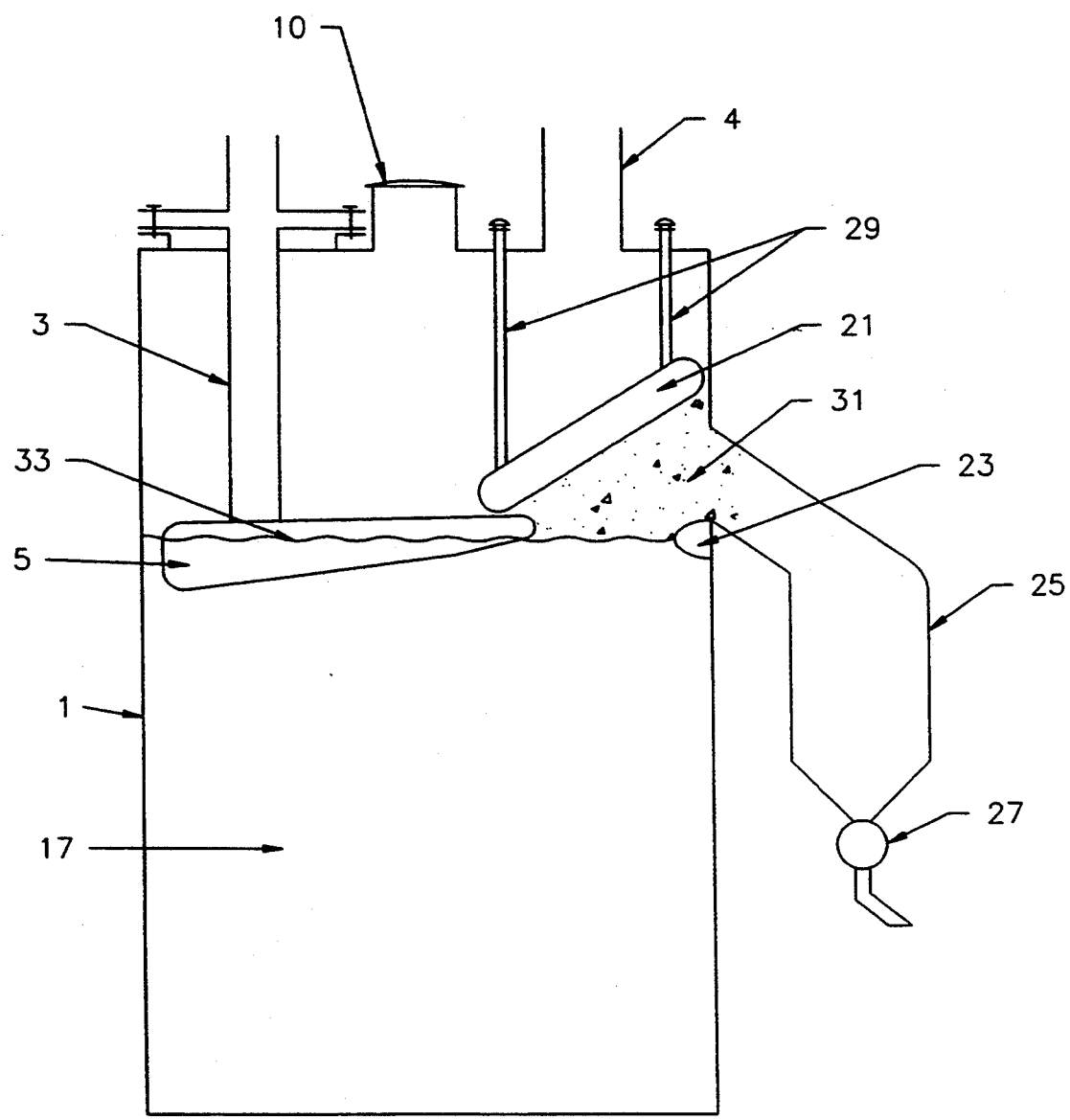
FIG. 5 shows an end view of a second embodiment of the reactor.

In FIG. 5 we've shown a second embodiment of the reactor 1 wherein treated solid 31 float to the surface 33 of molten metal 17 and are directed by sloping baffle 21 to overflow into container 25. Baffle 21 may be ceramic fused around adjustable supports 29. A ceramic projection 23 prevents molten metal overflow into container 25. Other figures in FIG. 5 are as previously described.

Figure 6:
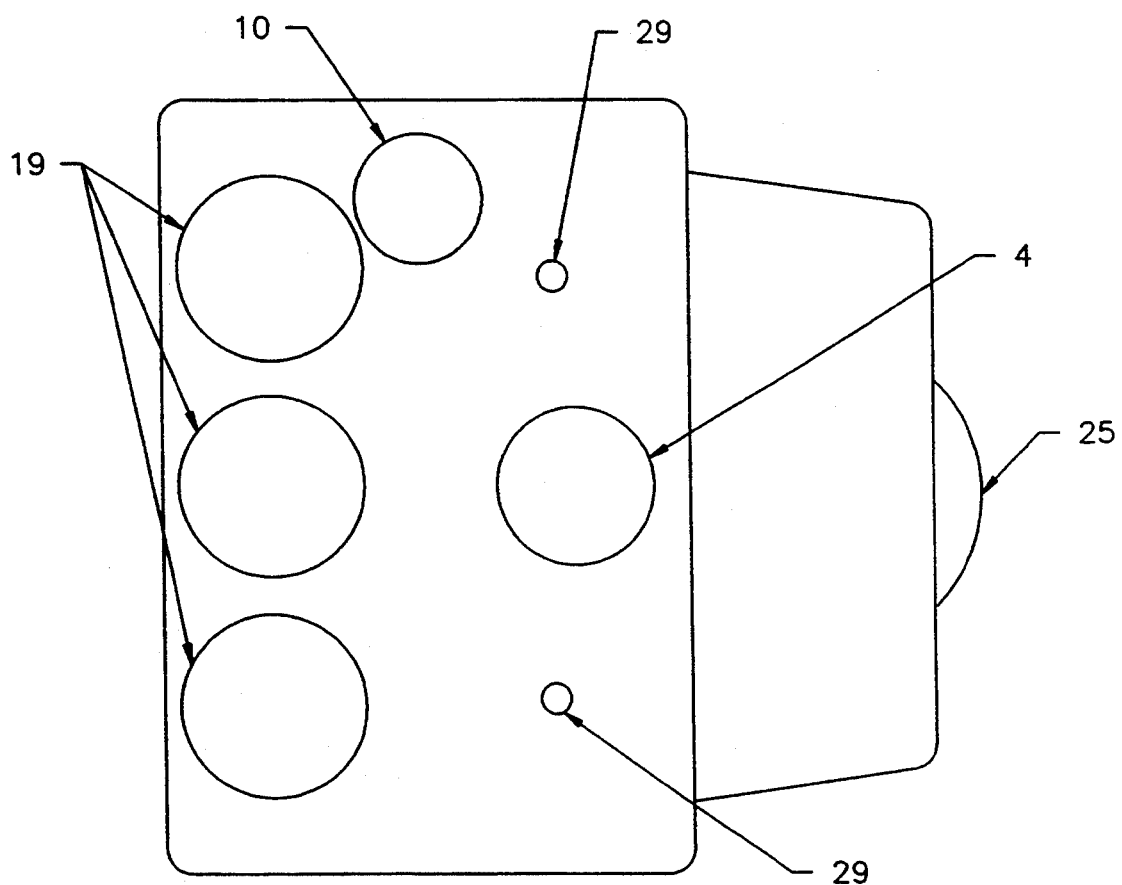
FIG. 6 shows a top view of the second embodiment of the reactor.
Figure 7:
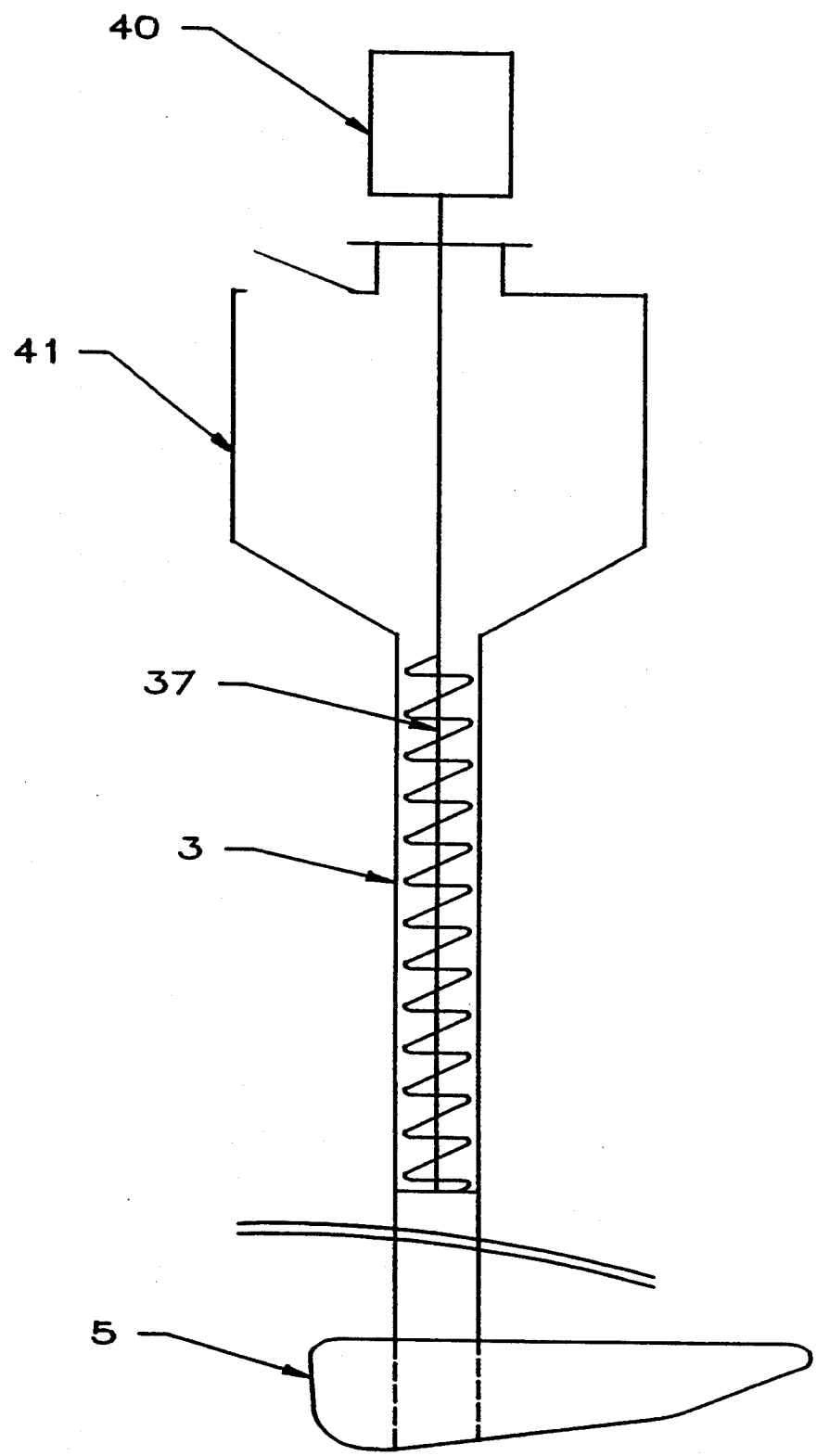
FIG. 7 shows a feed line with a screw conveyor to feed into the reactor.

In FIG. 6 we've shown a top view of FIG. 5 indicating the elongated shape of discharge container 25. Flange 19 is large enough to permit entry of diffuser shoe 5. The sight glass and filling port 10 is located to permit addition of metal to the alloy.

In FIG. 7 we've shown one feed tube 3 wherein a screw conveyor 37 driven by motor 40 allows continuously feeding solids or near solid sludges from bin 41 to below the surface of diffuser 5.

What is claimed is:

1. Equipment for molten alloy treatment of hazardous liquids and slurries comprising;
   a) a heated reactor;
   b) a metallic alloy held in a molten state above 800° C. in said reactor;
   c) a feed tube and a minimum of one ceramic feed diffuser unit, said diffuser unit being integrally cast on an end of said feed tube and adjustably held with a lower face of said diffuser unit submerged in said molten alloy;
   d) a feed means to force said liquids and slurries through said feed tube;
   e) a discharge unit attached to said reactor with a discharge opening in said reactor adjacent to a top level of said alloy in said reactor;
   f) a baffle means shaped and located to cause treated solids that exceed fixed quantity that float on said molten alloy to be forced through said discharge opening into said discharge unit;
   g) an off-gas line from said reactor;
   h) an aqueous gas contacter means and an aqueous scrubber to scrub effluent gases from said off-gas line; and
   i) a filter means to separate solids from liquid effluent from said scrubber.

2. Equipment for molten alloy treatment of hazardous liquids and slurries as in claim 1 further comprising a sight glass located in a top head of said reactor.

3. Equipment for molten alloy treatment of hazardous liquids and slurries as in claim 1 further comprising a hinged filling port to add metal to said molten alloy.

4. Equipment for molten alloy treatment of hazardous liquids and slurries as in claim 1 further comprising all inert gas purge line entering said reactor above said molten alloy level.

5. Equipment for molten alloy treatment of hazardous liquids and slurries as in claim 4 further comprising an inert gas purge to purge air from said feed line.

6. Equipment for molten alloy treatment of hazardous liquids and slurries as in claim 1 wherein said filter means comprises dual in-line filter to separate sludge from said scrubber effluent.

7. Equipment for molten alloy treatment of hazardous liquids and slurries as in claim 1 wherein said gas contactor means ahead of said scrubber comprises multiple spray nozzles in said off-gas line.

8. Equipment for molten alloy treatment of hazardous liquids and slurries as in claim 1 further comprising a centrifugal pump to recycle liquid from said filter means through a cooler means to said gas contactor means.

9. Equipment for molten alloy treatment of hazardous liquids and slurries as in claim 1 wherein said heated reactor is heated by an induction heater.

10. Equipment for molten alloy treatment of hazardous liquids and slurries as in claim 1 wherein said heated reactor is heated with fossil fuel.

11. Equipment for molten alloy treatment of hazardous liquids and slurries as in claim 1 wherein said feed means is a diaphragm type pump.

12. Equipment for molten alloy treatment of hazardous liquids and slurries as in claim 1 wherein said feed means is a star feeder valve.

13. Equipment for molten alloy treatment of hazardous liquids and slurries as in claim 1 wherein said feed means is a screw conveyor.

14. Equipment for molten alloy treatment of hazardous liquids and slurries comprising:
 a) a heated reactor;
 b) a metallic alloy held in a molten state above 800° C. in said reactor;
 c) a feed tube and a minimum of one ceramic feed diffuser unit adjustably held with a lower face of said diffuser unit submerged in said metallic alloy;
 d) a feed means to force said liquids and said slurries through said feed tube;
 e) a discharge unit attached to said reactor with a discharge opening in said reactor adjacent to a top level of said alloy in said reactor;
 f) a ram means, shaped and located to push treated solids that float to said molten alloy surface through said discharge opening into said discharge unit;
 g) an off-gas line from said reactor;
 h) an aqueous gas contactor means and an aqueous scrubber to scrub effluent gases from said off-gas line; and
 i) a filter means to separate solids from liquid effluent from said scrubber.

* * * * *